B. JOHNSTON.
Cultivator.

No. 101,468.

Patented April 5, 1870.

Witnesses:
A Bennewendorf
Edgar Tate

Inventor:
B. Johnston
Per Munn & Co
Attorneys

UNITED STATES PATENT OFFICE.

BENJAMIN JOHNSTON, OF NEW IBERIA, LOUISIANA.

IMPROVEMENT IN FINISHING-CULTIVATORS.

Specification forming part of Letters Patent No. 101,468, dated April 5, 1870.

*To all whom it may concern:*

Be it known that I, BENJAMIN JOHNSTON, of New Iberia, in the parish of Iberia and State of Louisiana, have invented a new and useful Improvement in Finishing-Cultivators; and I do hereby declare that the following is a full, clear, and exact description thereof, which will enable others skilled in the art to make and use the same, reference being had to the accompanying drawings, forming part of this specification, in which—

Figure 1:
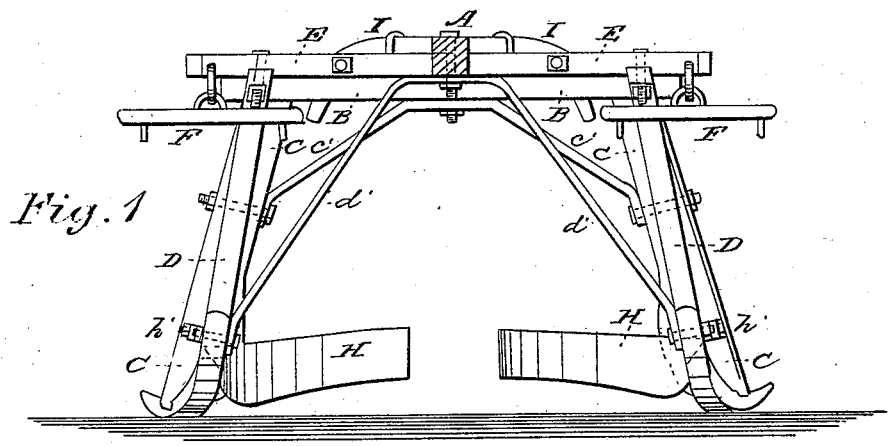
Figure 2:
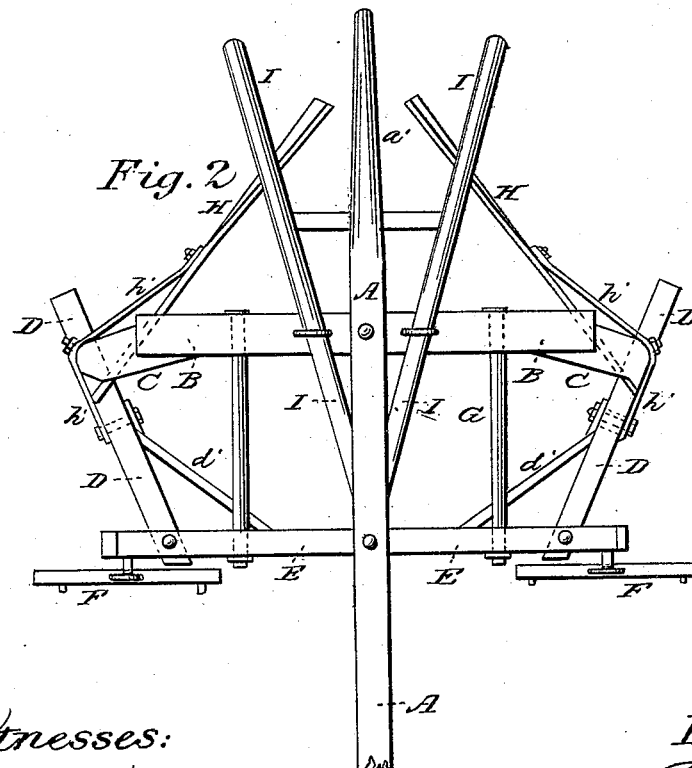

Figure 1 is a front view of my improved machine. Fig. 2 is a top view of the same.

Similar letters of reference indicate corresponding parts.

My invention has for its object to furnish a simple and convenient machine by means of which plants planted in hills or drills may be "laid by" or finished, and which will do its work rapidly, uniformly, and well; and it consists of the machine constructed as hereinafter more fully described.

A is the tongue, which should be made about twelve feet long, and to which, near its rear end, is securely and firmly attached a cross-beam, B.

To the ends of the beam B are attached the upper ends of the knees C, which incline outward in the manner of sleigh-knees, and the connection between which and the beam B is strengthened by braces $c'$, as shown in Fig. 1.

To the lower ends of the knees C are attached the short runners D, the forward ends of which are extended upward and forward, and are attached to the cross-bar E. The middle part of the cross-bar E is securely attached to the tongue C, and the connection between said cross-bar and the upper parts of the runners D is strengthened by the braces $d'$, as shown in Figs. 1 and 2. The whiffletrees F are connected with the ends of the cross-bar E, as shown in Figs. 1 and 2. The end parts of the cross-bar E and of the cross-beam B are connected by long bolts G, to give strength and rigidity to the machine and enable it to better sustain the draft strain. The parts of the runners D that come in contact with the ground may be shod with iron to prevent wear.

H are the finishing-plates, which are placed in inclined positions, as shown in Figs. 1 and 2, and the forward ends of which are notched to fit upon the upper inner edge of the runners D, and are securely bolted to the lower parts of the knees C. The lower edges of the plates H are concaved to give a proper form to the ridges. The plates H are further supported and strengthened by the braces $h'$, attached to the plates H, knees C, and runners D, as shown in Fig. 2.

The machine should be about six feet wide between the runners D, and should be about five feet high, so as to straddle the row of plants, however high it may be, and at the same time finish both sides of the ridge.

I are handles, placed one upon each side of the rear end of the tongue A, and the forward ends of which are attached to the sides of the tongue A. The handles I are attached to the cross-beam B, and are connected with the handle $a'$, formed upon or attached to the rear end of the tongue A by a round or cross bar. The machine is thus provided with three handles, so that the operator may walk upon either side of the row of plants while guiding the machine, as may be convenient.

Having thus described my invention, I claim as new and desire to secure by Letters Patent—

An improved finishing-cultivator, constructed, arranged, and operating substantially as herein shown and described, and for the purpose set forth.

BENJAMIN JOHNSTON.

Witnesses:
I. A. TARLETON,
D. B. THOMPSON.